United States Patent

Eguchi et al.

Patent Number: 5,412,571
Date of Patent: May 2, 1995

[54] FOUR-WHEEL STEERING APPARATUS FOR MOTOR VEHICLE

[75] Inventors: Takaaki Eguchi; Hiroshi Mouri, both of Kanagawa, Japan

[73] Assignee: Nissan Motor Co., Ltd., Yokohama, Japan

[21] Appl. No.: 281,114

[22] Filed: Jul. 28, 1994

Related U.S. Application Data

[63] Continuation of Ser. No. 795,331, Nov. 20, 1991, abandoned.

[30] Foreign Application Priority Data

Nov. 28, 1990 [JP] Japan .................................. 2-332011

[51] Int. Cl.⁶ .......................... B60G 17/06; B62D 5/06
[52] U.S. Cl. .............................. 364/424.05; 280/707; 280/91; 180/140; 180/142
[58] Field of Search ................... 364/424.05; 180/140, 180/141, 142; 280/91, 99, 773

[56] References Cited

U.S. PATENT DOCUMENTS

| | | | |
|---|---|---|---|
| 4,834,204 | 5/1989 | Ito et al. | 180/140 |
| 4,878,557 | 11/1989 | Shibahata et al. | 180/140 |
| 4,934,474 | 6/1990 | Sugasawa | 364/424.05 |
| 4,942,532 | 7/1990 | Mori | 364/424.05 |
| 4,998,201 | 3/1991 | Mori | 364/424.05 |
| 5,003,480 | 3/1991 | Mori et al. | 364/424.05 |
| 5,180,026 | 1/1993 | Mori | 180/140 |

FOREIGN PATENT DOCUMENTS

| | | |
|---|---|---|
| 60-183266 | 9/1985 | Japan . |
| 60-191876 | 9/1985 | Japan . |
| 61-57463 | 3/1986 | Japan . |
| 62-241769 | 10/1987 | Japan . |
| 63-41281 | 2/1988 | Japan . |
| 63-251374 | 10/1988 | Japan . |

Primary Examiner—Gary Chin
Assistant Examiner—Tyrone V. Walker
Attorney, Agent, or Firm—Foley & Lardner

[57] ABSTRACT

A four-wheel steering apparatus for use with a motor vehicle supported on a pair of front wheels and a pair of rear wheels. The apparatus comprises a control unit for steering the front wheels to provide a front wheel auxiliary steer angle satisfying the following equation:

$$\frac{\delta_{f(S)}}{\theta_{(S)}} = \frac{K + \tau_1 \cdot S + \tau_2 \cdot S^2}{1 + T_1 \cdot S + T_2 \cdot S^2}$$

where $\theta_{(s)}$ is a Laplace transform of the front wheel steer angle and $\delta_{f(s)}$ is a Laplace transform of the front wheel auxiliary steer angle, S is a Laplacian, and K, $\tau_1$, $\tau_2$, $T_1$ and $T_2$ are constants inherent on the motor vehicle and for steering the rear wheels to provide a rear wheel auxiliary steer angle satisfying the following equation:

$$\frac{\delta_{r(S)}}{\theta_{(S)}} = \frac{K' + \tau_1' \cdot S + \tau_2' \cdot S^2}{1 + T_1' \cdot S + T_2' \cdot S^2}$$

where $\theta_{(s)}$ is a Laplace transform of the front wheel steer angle, $\delta_{r(s)}$ is a Laplace transform of the rear wheel auxiliary steer angle, and K', $\tau_1'$, $\tau_2'$, $T_1'$ and $T_2'$ are constants inherent on the motor vehicle.

1 Claim, 3 Drawing Sheets

FOUR-WHEEL STEERING APPARATUS FOR MOTOR VEHICLE

This application is a continuation of application Ser. No. 07/795,331, filed Nov. 20, 1991, now abandoned.

BACKGROUND OF THE INVENTION

This invention relates to a four-wheel steering apparatus for use with a motor vehicle supported by a pair of front wheels and a pair of rear wheels.

For example, U.S. Pat. Nos. 4,942,532 and 5,003,480 disclose apparatus for steering the rear wheels to provide an improved response time with respect to the steering wheel angle inputted by the operator. However, they fail to provide an optimum transient response characteristic to the motor vehicle when the front wheels are steered.

SUMMARY OF THE INVENTION

Therefore, it is a main object of the invention to provide a four-wheel steering apparatus which can provide an optimum transient response characteristic to a motor vehicle.

There is provided, in accordance with the invention, a four-wheel steering apparatus for use with a motor vehicle supported on a pair of front wheels and a pair of rear wheels. The apparatus comprises means sensitive to a front wheel steer angle for producing a signal indicative of a sensed front wheel steer angle, and means for steering the front wheels to provide a front wheel auxiliary steer angle satisfying the following equation:

$$\frac{\delta_{f(S)}}{\theta_{(S)}} = \frac{K + \tau_1 \cdot S + \tau_2 \cdot S^2}{1 + T_1 \cdot S + T_2 \cdot S^2}$$

where $\theta_{(S)}$ is a Laplace transform of the front wheel steer angle and $\delta_{f(S)}$ is a Laplace transform of the front wheel auxiliary steer angle, S is a Laplacian, and K, $\tau_1$, $\tau_2$, $T_1$ and $T_2$ are constants inherent on the motor vehicle. The apparatus also comprises means for steering the rear wheels to provide a rear wheel auxiliary steer angle satisfying the following equation:

$$\frac{\delta_{r(S)}}{\theta_{(S)}} = \frac{K' + \tau_1' \cdot S + \tau_2' \cdot S^2}{1 + T_1' \cdot S + T_2' \cdot S^2}$$

where $\theta_{(S)}$ is a Laplace transform of the front wheel steer angle, $\delta_{r(S)}$ is a Laplace transform of the rear wheel auxiliary steer angle, and K', $\tau_1'$, $\tau_2'$, $T_1'$ and $T_2'$ are constants inherent on the motor vehicle.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
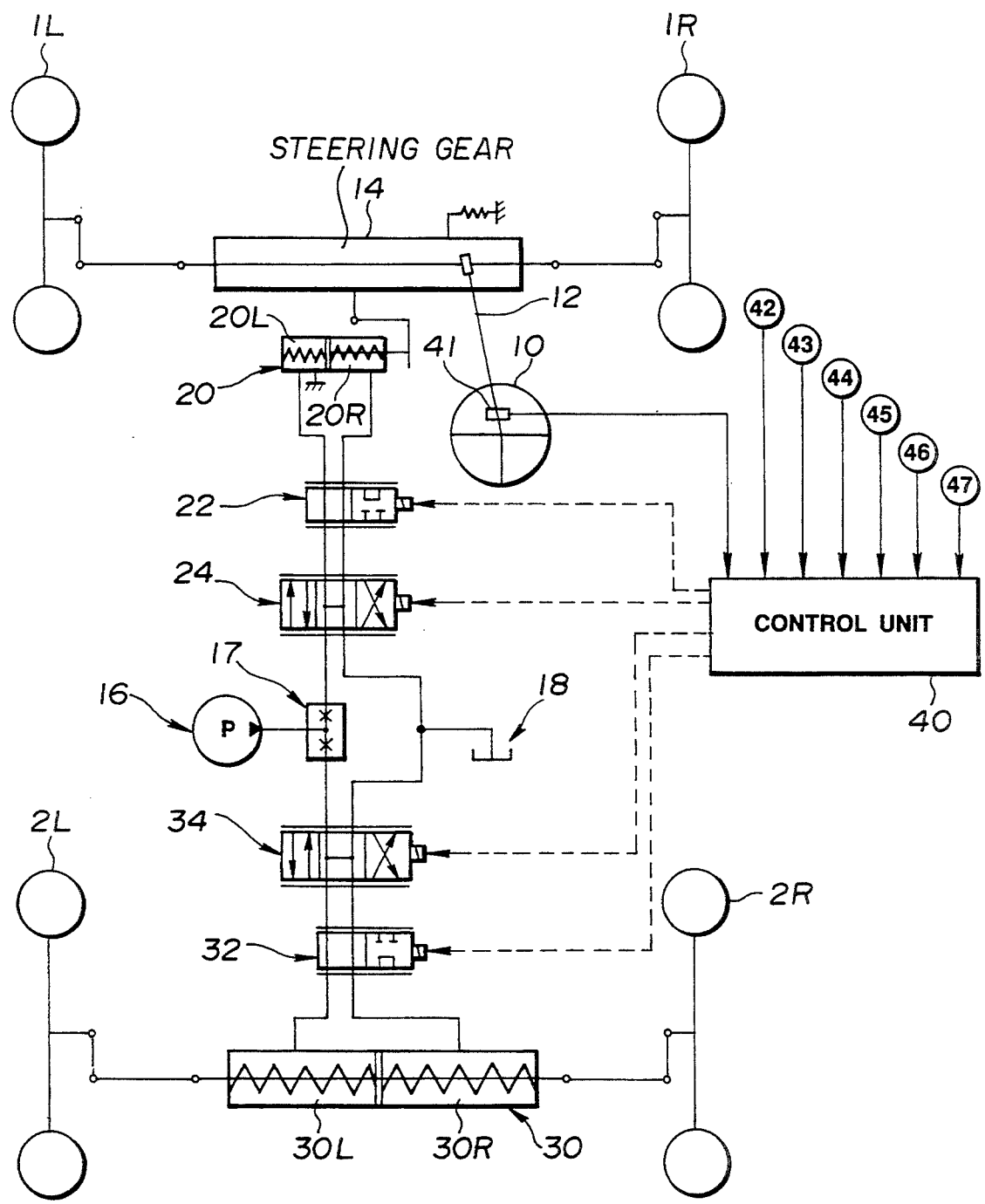
FIG. 1 is a schematic diagram showing one embodiment of a four-wheel steering apparatus made in accordance with the invention.

With reference to the drawings, and in particular to FIG. 1, there is shown a schematic diagram of a four-wheel steering apparatus embodying the invention. The four-wheel steering apparatus will be described in connection with a motor vehicle supported on a pair of steerable front wheels 1L and 1R spaced laterally apart at equal distances from a vehicle longitudinal axis and a pair of steerable rear wheels 2L and 2R spaced laterally apart at equal distances from the vehicle longitudinal axis.

The front wheels 1L and 1R are connected to a steering wheel or handle 10 through a conventional link mechanism including a steering shaft 12 and a steering gear 14. The link mechanism steers the front wheels 1L and 1R at an angle $\Theta$ in response to the angle $\Theta$ of rotation of the steering wheel 10 with respect to its neutral or straight-ahead position. The front wheel steer angle $\theta$ is given as $\theta = \Theta/N$ where N is the steering gear ratio. The steering gear 14 is mounted for reciprocal motion in the direction of width of the motor vehicle to provide an auxiliary steer angle $\delta f$ to the front wheels 1L and 1R. The stroke of reciprocal motion of the steering gear 14 is determined by the amount of deflection of the elastic member used to suspend the steering gear 14 on the motor vehicle.

The steering gear 14 is associated with a front wheel steering actuator 20 of the spring center type having two pressure chambers 20L and 20R for turning the front wheels 1L and 1R in response to the hydraulic pressure acting in the first or second pressure chamber 20L or 20R. The front wheel steering actuator 20 moves the steering gear 14 to turn the front wheels 1L and 1R in a first direction at an angle $\delta_f$ proportional to the pressure introduced into the first pressure chamber 20L with respect to the vehicle longitudinal axis. The front wheel steering actuator 20 moves the steering gear 14 to turn the front wheels 1L and 1R in a second, opposite direction at an angle $\delta_f$ proportional to the pressure introduced into the second pressure chamber 20R with respect to the vehicle longitudinal axis. The first pressure chamber 20L is connected through a cutoff solenoid valve 22 to a control valve 24. Similarly, the second pressure chamber 20R is connected through the cutoff solenoid valve 22 to the control valve 24.

The cutoff valve 22 is normally in a closed position cutting off communication between the control valve 24 and the front wheel steering actuator 20. The cutoff valve 22 moves to its open position to establish communication between the control valve 24 to the front wheel steering actuator 20 in the presence of a drive signal applied thereto from a control unit 40. The control unit 40 interrupts the drive signal to the cutoff valve 22 when the ignition switch (not shown) is turned off or when a trouble occurs in the steering apparatus.

The control valve 24 is operable on a command current signal fed thereto from the control unit 40 to occupy one of three positions. The first position is occupied when the command current signal is at a first level and the control valve 24 provides communication of the first chamber 20L of the front wheel steering actuator 20 with a pump 16 through a flow divider 17 and communication of the second chamber 20R of the front wheel steering actuator 20 with a reservoir 18. As a result, the front wheels 1L and 1R turn in the first direction. The second position, illustrated in FIG. 1, is occupied when the command current signal is at a second level and the control valve 24 interrupts the communication of the first chamber 20L of the front wheel steering actuator 20 with the pump 16 and the communication of the second chamber 20R of the front wheel steering actuator 20 with the reservoir 18. As a result, the existing front wheel auxiliary steer angle is retained. The third position is occupied when the command current signal is at a third level and the control valve 24 provides communication of the first chamber 20L of the front wheel steering actuator 20 with the reservoir 18 and communication of the second chamber 20R of the front wheel steering actuator 20 with the pump 16. As a result, the front wheels 1L and 1R turn in the second direction opposite to the first direction.

The rear wheels 2L and 2R are associated with a rear wheel steering actuator 30 of the spring center type having two pressure chambers 30L and 30R for turning the rear wheels 2L and 2R in response to the hydraulic pressure acting in the first or second pressure chamber 30L or 30R. The rear wheel steering actuator 30 turns the rear wheels 2L and 2R in a first direction at an angle $\delta_r$ proportional to the pressure introduced into the first pressure chamber 30L with respect to the vehicle longitudinal axis. The rear wheel steering actuator 30 turns the rear wheels 2L and 2R in a second, opposite direction at an angle $\delta_r$ proportional to the pressure introduced into the second pressure chamber 30R with respect to the vehicle longitudinal axis. The first pressure chamber 30L is connected through a cutoff solenoid valve 32 to a control valve 34. Similarly, the second pressure chamber 30R is connected through the cutoff solenoid valve 32 to the control valve 34.

The cutoff valve 32 is normally in a closed position cutting off communication between the control valve 34 and the rear wheel steering actuator 30. The cutoff valve 32 moves to its open position to establish communication between the control valve 34 to the rear wheel steering actuator 30 in the presence of a drive signal applied thereto from a control unit 40. The control unit 40 interrupts the drive signal to the cutoff valve 32 when the ignition switch (not shown) is turned off or when a trouble occurs in the steering apparatus.

The control valve 34 is operable on a command current signal fed thereto from the control unit 40 to occupy one of three positions. The first position is occupied when the command current signal is at a first level and the control valve 34 provides communication of the first chamber 30L of the rear wheel steering actuator 30 with the pump 16 through the flow divider 17 and communication of the second chamber 30R of the rear wheel steering actuator 30 with the reservoir 18. As a result, the rear wheels 2L and 2R turn in the first direction. The second position, illustrated in FIG. 1, is occupied when the command current signal is at a second level and the control valve 34 interrupts the communication of the first chamber 30L of the rear wheel steering actuator 30 with the pump 16 and the communication of the second chamber 30R of the rear wheel steering actuator 30 with the reservoir 18. As a result, the existing rear wheel auxiliary steer angle is retained. The third position is occupied when the command current signal is at a third level and the control valve 34 provides communication of the first chamber 30L of the rear wheel steering actuator 30 with the reservoir 18 and communication of the second chamber 30R of the rear wheel steering actuator 30 with the pump 16. As a result, the rear wheels 2L and 2R turn in the second direction opposite to the first direction.

The front- and rear-wheel auxiliary steer angles $\delta_f$ and $\delta_r$ are repetitively determined from calculations performed by the control unit 40, these calculations being based upon various conditions of the automotive vehicle that are sensed during its operation. These sensed conditions include steering wheel angle, vehicle speed, engine speed, transmission position, clutch position, etc. Thus, a steering wheel angle sensor 41, a vehicle speed sensor 42, an engine speed sensor 43, a neutral switch 44, a clutch switch 45, a stop lamp switch 46, a G sensor 47, etc. The steering wheel angle sensor 41 is sensitive to a steering wheel angle; that is, the angle of rotation of the steering wheel 10 with respect to its neutral or straight-ahead position and it produces an electric signal indicative of the sensed steering wheel angle.

The control unit 40 may employ a digital computer including a central processing unit (CPU), a random access memory (RAM), a read only memory (ROM) and an input/output control circuit (I/O). The central processing unit communicates with the rest of the computer via data bus. The input/output control circuit includes an analog-to-digital converter for converting the analog sensor signals applied thereto, one by one, into digital form for application to the central processing unit. The read only memory contains the programs for operating the central processing unit and further contains appropriate data used in calculating appropriate values $\delta_f$ and $\delta_r$ for front- and rear-wheel auxiliary steer angles.

Figure 2:
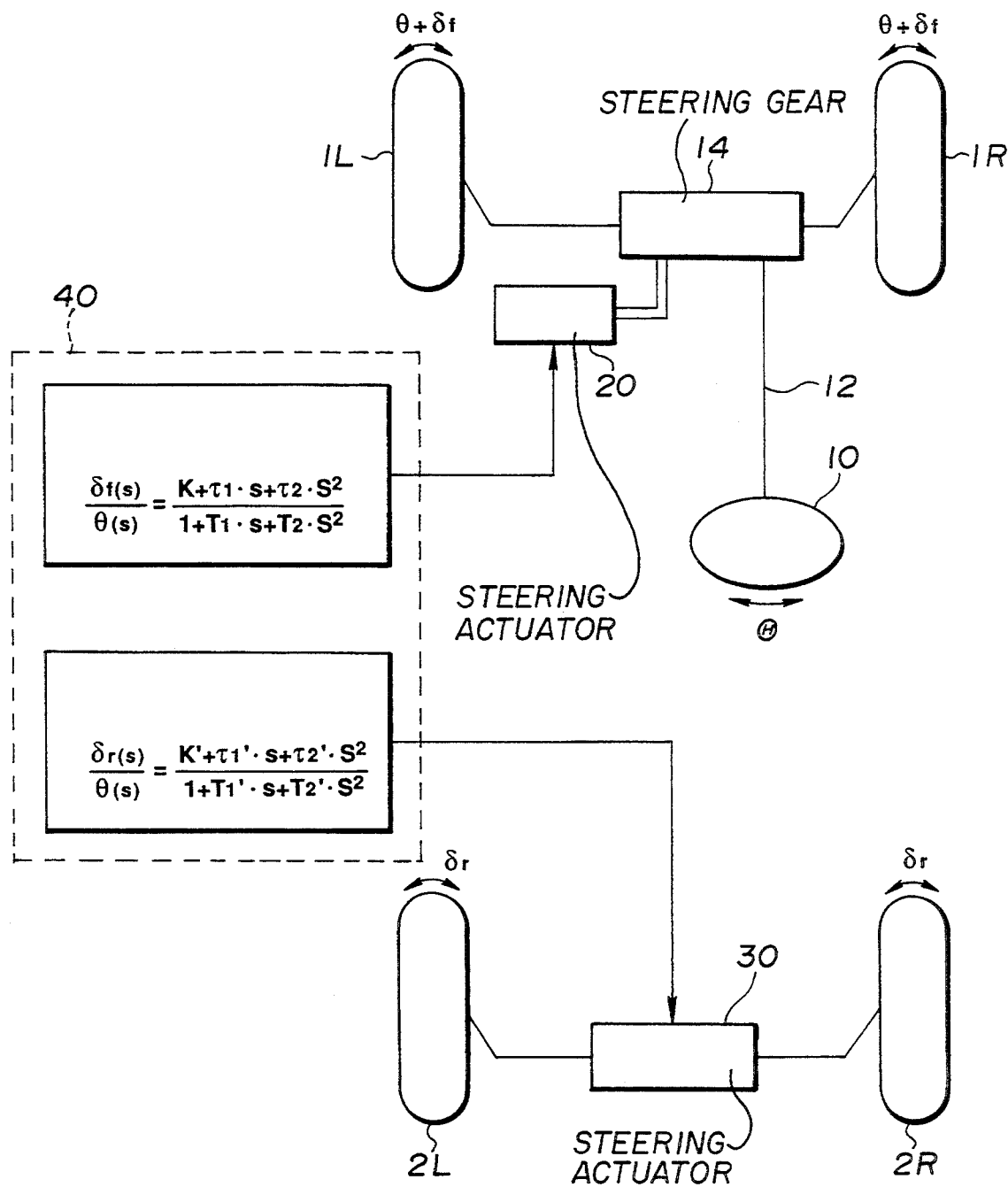
FIG. 2 is a schematic diagram showing front- and rear-wheel auxiliary steer angle controls made in the four-wheel steering apparatus of FIG. 1.

As shown in FIG. 2 the central processing unit calculates a front wheel steer angle (front wheel steering input) $\theta$ as $\theta = \Theta/N$ where $\Theta$ is the sensed steering wheel angle and N is the steering gear ratio. The central processing unit calculates a first transfer function from the following equation:

$$\frac{\delta_{f(S)}}{\theta_{(S)}} = \frac{K + \tau_1 \cdot S + \tau_2 \cdot S^2}{1 + T_1 \cdot S + T_2 \cdot S^2} \quad (1)$$

where $\theta_{(s)}$ is the Laplace transform of the front wheel steer angle $\theta$, $\delta_{f(s)}$ is the Laplace transform of the front wheel auxiliary steer angle $\delta_f$, S is the Laplacian, and K, $\tau_1$, $\tau_2$, $T_1$ and $T_2$ are constants inherent on the automotive vehicle. The calculated first transfer function is used to calculate a desired value $\delta_f$ for the front wheel auxiliary steer angle.

Similarly, the central processing unit calculates a second transfer function from the following equation:

$$\frac{\delta_{r(S)}}{\theta_{(S)}} = \frac{K' + \tau_1' \cdot S + \tau_2' \cdot S^2}{1 + T_1' \cdot S + T_2' \cdot S^2} \quad (2)$$

where $\theta_{(s)}$ is the Laplace transform of the front wheel steer angle $\theta$, $\delta_{r(s)}$ is the Laplace transform of the rear wheel auxiliary steer angle $\delta_r$, S is the Laplacian, and K', $\tau_1'$, $\tau_2'$, $T_1'$ and $T_2'$ are constants inherent on the automotive vehicle. The calculated second transfer function is used to calculate a desired value $\delta_r$ for the rear wheel auxiliary steer angle.

Control words specifying desired front- and rear-wheel auxiliary steer angles $\delta_f$ and $\delta_r$ are periodically transferred by the central processing unit to the input/output control circuit where they are converted into analog form for controlling the control valves 20 and 30 to achieve the calculated front- and rear-wheel auxiliary steer angles $\delta_f$ and $\delta_r$, respectively.

Figure 3:
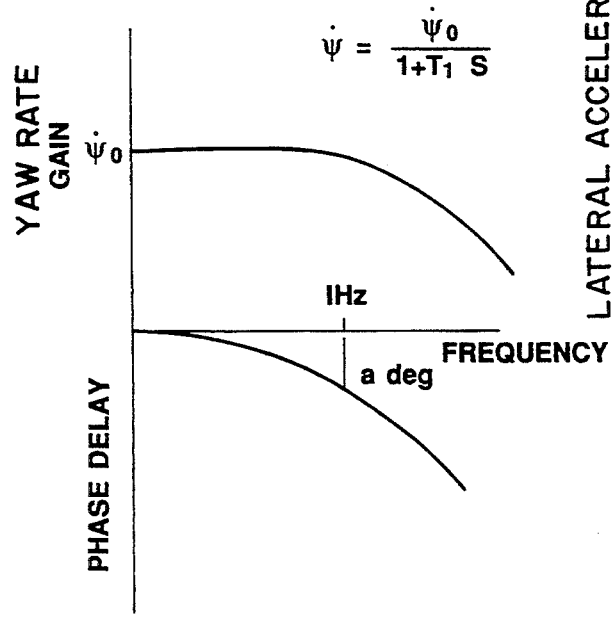
FIG. 3 is a graph of yaw rate gain and phase delay versus steering frequency.
Figure 4:
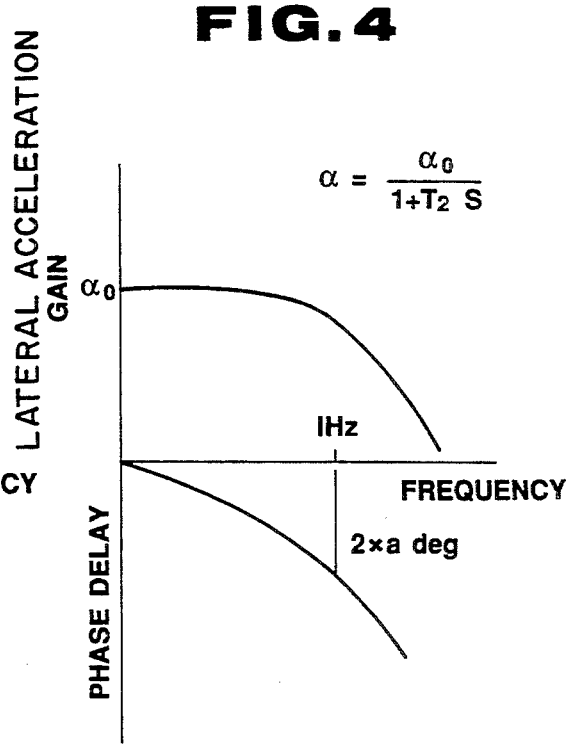
FIG. 4 is a graph of lateral acceleration gain and phase delay versus steering frequency.
Figure 5:
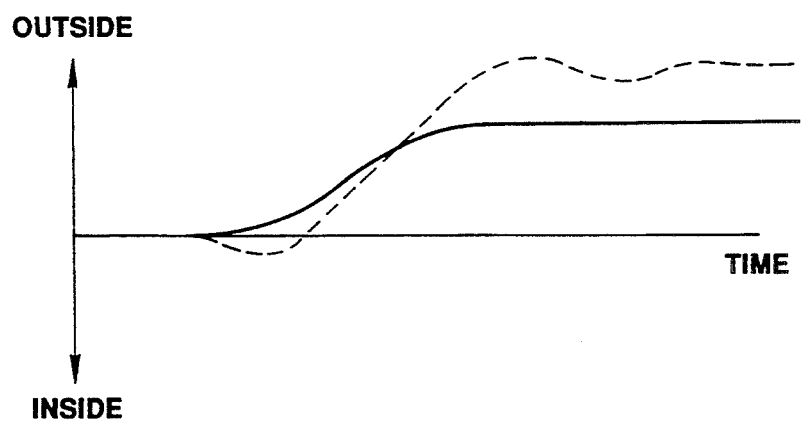
FIG. 5 is a graph of lateral slip angle versus time.

The four-wheel steering apparatus of the invention can control the rear wheel auxiliary steer angle to provide a desired first order delay to the steering frequency response characteristic of the yaw rate applied to the automotive vehicle, as shown in FIG. 3, and also can control the front wheel auxiliary steer angle to provide a desired first order delay to the steering frequency response characteristic of the lateral acceleration applied to the automotive vehicle, as shown in FIG. 4. This is effective to provide an optimum lateral slip angle characteristic as shown in FIG. 5. It can be seen from FIG. 5 that an appropriate lateral slip angle is produced smoothly toward the outside of the circle in which the automotive vehicle is turning at the early stage of the vehicle turning motion. At the subsequent stage of the vehicle turning motion, the lateral slip angle increases to a steady-state value without oscillation. It is, therefore, possible to provide an optimum transient response characteristic to the motor vehicle. In FIG. 5, the dotted curve indicates a lateral slip angle characteristic obtained by a conventional vehicle steering apparatus.

What is claimed is:

1. A four-wheel steering apparatus for use with a motor vehicle supported on a pair of front wheels and a pair of rear wheels, the apparatus comprising:

means sensitive to a front wheel steer angle for producing a signal indicative of a sensed front wheel steer angle;

means for steering the front wheels to provide a front wheel auxiliary steer angle for actuating movement of the front wheels satisfying the following equation:

$$\frac{\delta_{f(s)}}{\theta_{(s)}} = \frac{K + \tau_1 \cdot S + \tau_2 \cdot S^2}{1 + T_1 \cdot S + T_2 \cdot S^2}$$

where $\theta_{(s)}$ is a Laplace transform of the front wheel steer angle and $\delta_{f(s)}$ is a Laplace transform of the front wheel auxiliary steer angle, S is a Laplacian, and K $\tau_1$, $\tau_2$, $T_1$ and $T_2$ are constants inherent on the motor vehicle, thereby providing a first order delay to the steering frequency response characteristic of the lateral acceleration applied to the motor vehicle; and means for steering the rear wheels to provide a rear wheel auxiliary steer angle for actuating movement of the rear wheels satisfying the following equation:

$$\frac{\delta_{r(s)}}{\theta_{(s)}} = \frac{K' + \tau_1' \cdot S + \tau_2' \cdot S^2}{1 + T_1' \cdot S + T_2' \cdot S^2}$$

where $\theta_{(s)}$ is a Laplace transform of the front wheel steer angle, $\delta_{r(s)}$ is a Laplace transform of the rear wheel auxiliary steer angle, and K', $\tau_1'$, $\tau_2'$, $T_1'$ and $T_2'$ are constants inherent on the motor vehicle, thereby providing a first order delay to the steering frequency response characteristic of the yaw rate applied to the motor vehicle;

whereby the first order delays to the steering frequency response characteristics of the lateral acceleration and the yaw rate provide an optimum lateral slip angle characteristic.

* * * * *